(12) United States Patent
Dautl et al.

(10) Patent No.: US 9,132,508 B2
(45) Date of Patent: Sep. 15, 2015

(54) METHOD FOR PRODUCING A ROTOR OR STATOR BLADE AND SUCH A BLADE

(75) Inventors: Thomas Dautl, Weichs (DE); Andreas Jakimov, Munich (DE); Manuel Hertter, Munich (DE)

(73) Assignee: MTU Aero Engines GmbH, Munich (DE)

( * ) Notice: Subject to any disclaimer, the term of this patent is extended or adjusted under 35 U.S.C. 154(b) by 648 days.

(21) Appl. No.: 13/501,727

(22) PCT Filed: Oct. 2, 2010

(86) PCT No.: PCT/DE2010/001167
§ 371 (c)(1),
(2), (4) Date: Apr. 27, 2012

(87) PCT Pub. No.: WO2011/044876
PCT Pub. Date: Apr. 21, 2011

(65) Prior Publication Data
US 2012/0201691 A1 Aug. 9, 2012

(30) Foreign Application Priority Data

Oct. 17, 2009 (DE) .......................... 10 2009 049 707

(51) Int. Cl.
*B23K 26/34* (2014.01)
*B23P 15/04* (2006.01)
(Continued)

(52) U.S. Cl.
CPC .............. *B23K 26/34* (2013.01); *B23K 26/322* (2013.01); *B23K 26/3206* (2013.01); *B23K 26/3213* (2013.01); *B23K 26/3226* (2013.01); *B23K 35/004* (2013.01); *B23K 35/005* (2013.01); *B23K 35/007* (2013.01); *B23P 15/04* (2013.01); *C23C 24/04* (2013.01); *F01D 5/147* (2013.01); *F01D 5/284* (2013.01); *F01D 5/3007* (2013.01); *F01D 5/3084* (2013.01);
(Continued)

(58) Field of Classification Search
CPC ..................................... F01D 5/15; F01D 5/18
USPC ...................................................... 416/214 A
See application file for complete search history.

(56) References Cited

U.S. PATENT DOCUMENTS 5,318,406 A * 6/1994 Bardes ........................ 416/223 A
6,127,044 A * 10/2000 Yamamoto et al. ............ 428/603
(Continued)

FOREIGN PATENT DOCUMENTS

DE            466222 C     9/1928
DE       102004001575 A1   8/2005
(Continued)

OTHER PUBLICATIONS

Special Metals; Sep. 7, 2007; Special Metals Corporation; p. 1.*
(Continued)

*Primary Examiner* — Nathaniel Wiehe
*Assistant Examiner* — Michael Sehn
(74) *Attorney, Agent, or Firm* — Howison & Arnott, LLP

(57) ABSTRACT

The invention relates to a method for producing a rotor or stator blade (1a) of a gas turbine, in particular an aircraft gas turbine (2), comprising forming a airfoil (8a) made of at least one first material and attaching a blade root (4a) made of at least one second material to the airfoil (8a) by means of a thermal spraying method. The invention further relates to a rotor or stator blade (1a) produced according to such a method.

2 Claims, 3 Drawing Sheets

(51) Int. Cl.
*C23C 24/04* (2006.01)
*F01D 5/14* (2006.01)
*F01D 5/28* (2006.01)
*F01D 5/30* (2006.01)
*B23K 26/32* (2014.01)
*B23K 35/00* (2006.01)

(52) U.S. Cl.
CPC ...... *B23K 2201/001* (2013.01); *F05D 2230/20* (2013.01); *F05D 2230/23* (2013.01); *F05D 2230/30* (2013.01); *Y02T 50/673* (2013.01); *Y10T 29/49337* (2015.01)

(56) References Cited

U.S. PATENT DOCUMENTS

| | | | |
|---|---|---|---|
| 6,269,540 | B1 | 8/2001 | Islam et al. |
| 7,334,995 | B2 * | 2/2008 | James ................ 416/193 A |
| 7,690,112 | B2 | 4/2010 | Bostanjoglo et al. |
| 2002/0066770 | A1 | 6/2002 | James et al. |
| 2008/0286108 | A1 | 11/2008 | Lui et al. |

FOREIGN PATENT DOCUMENTS

| | | | |
|---|---|---|---|
| DE | 102006031388 | A1 | 1/2008 |
| EP | 1361339 | A1 | 11/2003 |
| EP | 1382707 | A1 | 1/2004 |
| EP | 1464791 | A1 | 10/2004 |
| EP | 1553203 | A1 | 7/2005 |
| EP | 1637274 | A1 | 3/2006 |
| EP | 1903127 | A1 * | 3/2008 |
| WO | 2010064515 | A1 | 3/2010 |

OTHER PUBLICATIONS

PCT: International Search Report and Written Opinion of PCT/DE2010/001167; Mar. 9, 2011; 14 pages (only the ISR is translated).
German Patent and Trademark Office; German Search Report; Oct. 17, 2009; 4 pages.
Pattison et al: "Cold gas dynamic manufacturing: A non-thermal approach to freeform fabrication", International Journal of Machine Tool Design and Research, Perfamon Press, Oxford, GB, vol. 47, No. 3-4, Dec. 15, 2006, pp. 627-634, XP005804252, ISSN: 0020-7357, DOI: 10.1016/J.IJMACHTOOLS.2006.05.001 the whole document.

* cited by examiner

METHOD FOR PRODUCING A ROTOR OR STATOR BLADE AND SUCH A BLADE

CROSS-REFERENCE TO RELATED APPLICATIONS

This application is a U.S. National Phase application submitted under 35 U.S.C. §371 of Patent Cooperation Treaty application serial no. PCT/DE2010/001167, filed Oct. 2, 2010, and entitled METHOD FOR PRODUCING A ROTOR OR STATOR BLADE AND SUCH A BLADE, which application claims priority to German patent application serial no. 10 2009 049 707.2, filed Oct. 17, 2009, and entitled VERFAHREN ZUR HERSTELLUNG EINER LAUF-ODER STATORSCHAUFEL UND EINE DERARTIGE SCHAUFEL.

Patent Cooperation Treaty application serial no. PCT/DE2010/001167, published as WO 2011/044876, and German patent application serial no. 10 2009 049 707.2, are incorporated herein by reference.

TECHNICAL FIELD

The invention relates to a method for producing a rotor blade or stator blade for a gas turbine, in particular for an aircraft gas turbine.

BACKGROUND

In the case of rotor blades and stator blades it is advantageous to use lightweight, high-temperature-resistant materials, such as TiAl alloys. The disadvantage of these materials in many cases is a high level of brittleness and susceptibility to cracking, which is critical in particular in the region of the blade root on account of the types of loads and notch effect that occur there.

A method for producing turbine components by cold-gas-spraying, in which a material is sprayed by means of a cold-gas-spraying method onto a carrier, for example a ceramic core, in order to form the blade leaf, is known from Patent Application EP 1 903 127 A1. Adaptation of the materials in individual regions of the blade is not disclosed so the problem mentioned at the beginning occurs.

SUMMARY AND DESCRIPTION

In contrast, the object of the invention is to provide a method for producing a lightweight, high-temperature-resistant rotor blade or stator blade in which the disadvantages that have been mentioned do not occur.

This object is achieved by means of a method for producing a rotor blade or stator blade having the features of the claims and by means of a rotor blade or stator blade having the features of the claims.

In the case of a method in accordance with the invention for producing a rotor blade or stator blade of a gas turbine, in particular an aircraft gas turbine, having a blade root and a blade leaf, the blade root is applied to the blade leaf by means of a thermal spraying method. The method in accordance with the invention comprises forming the blade leaf from at least one first material and applying the blade root consisting of at least one second material to the blade leaf by means of a thermal spraying method. Such a method renders possible the formation of the blade root from materials that are different from that of the blade leaf so that the choice of materials of the blade sections can be made in an optimized way with regard to loading. On account of the production of the blade root from a suitable material it is possible to dispense with a wear-protection coating of the blade root. It is advantageous, furthermore, that the blade leaves can be produced inexpensively in large piece numbers, and the adaptation of the blades to the disks of the gas turbine can be effected by means of differently constructed blade roots.

It has proved to be particularly advantageous if a cold-gas-spraying method (cold spray) is used as the thermal spraying method. Kinetic cold-gas-spraying is a layer-building method in which a pulverulent material or a pulverulent mixture of different materials is applied at a very high speed to a carrier material, in the present case to the blade leaf. For this, the powder particles are injected into a gas stream of heated gas, the gas stream being accelerated by expansion in a cold-gas spraying nozzle that is formed mostly in the manner of a Laval nozzle. The spray particles are accelerated to such a high speed by injection into the gas stream that in contrast to other thermal spraying methods, even without previous partial melting or melting-on, upon impact on the substrate they form a dense and firmly adhering layer or a shaped body. Such a cold-gas-spraying method renders possible the formation of a firmly adhering, high-strength blade root consisting of a different material from that of the blade leaf.

In the case of a preferred exemplary embodiment of the method in accordance with the invention the blade leaf is produced from the at least one first material with and/or without cutting, and the blade root is formed by spraying on at least one second material that varies from the first material. The blade root is preferably produced by spraying on a material that is more ductile in relation to the first material and has a lower level of susceptibility to cracking. The blade leaf can be formed from a Ti alloy, in particular from a high-temperature-resistant, lightweight TiAl alloy, since the possibly high level of brittleness and susceptibility to cracking of such materials in the region of the blade root on account of the types of loads that occur in this section can be brought in as a result of the formation in accordance with the invention of the blade root from a ductile material on the blade leaf by means of a thermal spraying method. The blade root can be produced by spraying on a nickel-, cobalt-, or iron-based superalloy, in particular by spraying on IN718 brand alloy 718. The blade root can be formed so that it is already close to its final contour and after the spraying can be finely machined, for example with cutting.

The blade leaf can be formed by means of a generative method, for example a selective laser melting (SLM) method. Such a method renders possible contour-true production of the blade leaf from high-temperature-resistant materials, it being possible to adapt the component geometry on account of the execution of the generative method, for optimization for example, in a rapid and inexpensive manner.

Alternatively, the blade leaf can be produced simply in terms of manufacturing techniques by means of a conventional casting method.

The spraying is preferably effected in such a way that the contour of the blade root is at least substantially produced during the spraying. As a result, reworking of the sprayed blade root is avoided or at least reduced to a minimum.

It has proved to be particularly advantageous if the blade leaf is formed in such a way that, after the application of the blade root, in addition to the force- and material-locking connection a form-locking or positive connection is established. As a result of the geometrical design of the blade leaf in the region of the blade root, the connection with the blade root can be further improved. In particular, the separation of the blade leaf from the blade root during operation can be prevented, even in the case of extreme loads.

In the case of a concrete exemplary embodiment of the method, in the region of the blade root the blade leaf is constructed with an outer contour that is similar to the outer contour course of the blade root.

Spraying the blade root can be effected in such a way that the blade root is formed with a fir-tree structure. A reliable connection of the rotor blades with the disk is achieved by means of this known shaping.

In the case of a preferred method the blade leaf and the blade root are formed in such a way that in the root region the blade leaf has a cross-section that is enlarged at least in sections in comparison with the rest of the blade leaf. The blade leaf and the blade root are in this connection preferably formed in such a way that the blade leaf extends through the blade root in the direction of the fixable end of the blade, and a free end section of the blade leaf has a cross-section that is enlarged in comparison with the blade leaf. This blade-leaf region, in the case of a concrete exemplary embodiment of the method, is provided with a substantially T-shaped holding section.

A rotor blade or stator blade in accordance with the invention for a gas turbine, in particular for an aircraft gas turbine, has a blade root and a blade leaf, wherein the blade leaf is formed from at least one first material and the blade root consisting of at least one second material is applied to the blade leaf by means of a thermal spraying method.

Other advantageous exemplary embodiments constitute subject matter of further subclaims.

BRIEF DESCRIPTION OF THE DRAWINGS

Preferred exemplary embodiments of the invention are explained in greater detail in the following with the aid of diagrammatic representations. In the figures.

DETAILED DESCRIPTION

Figure 1:
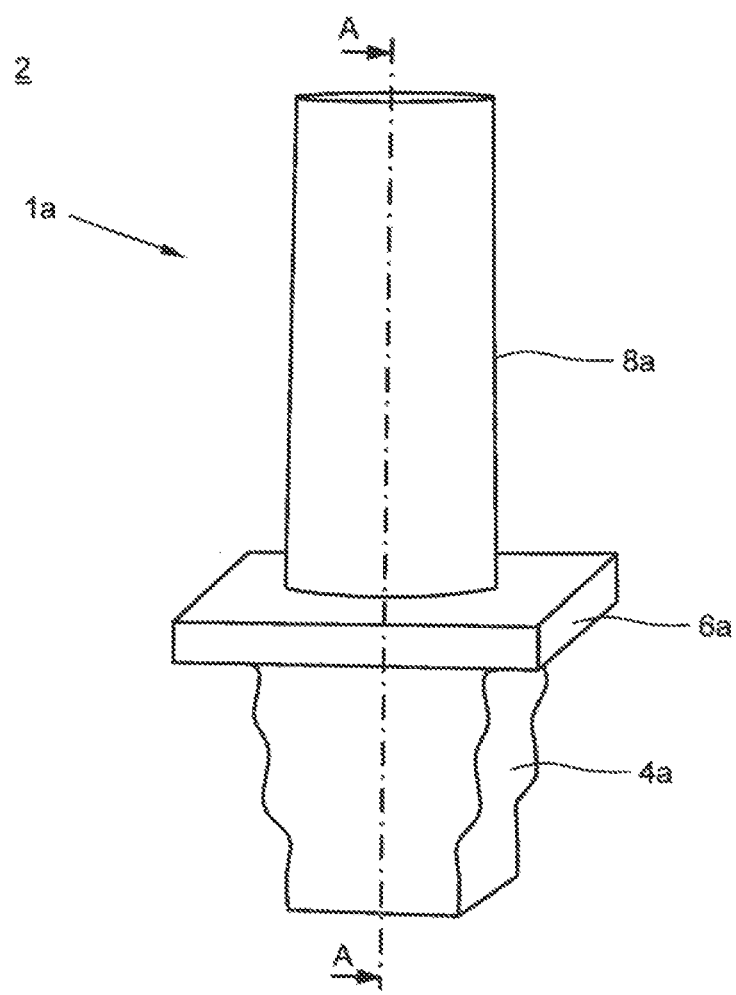
FIG. 1 shows a three-dimensional representation of a rotor blade, in accordance with the invention, of an aircraft gas turbine.

FIG. 1 shows a rotor blade 1a of a gas turbine formed as an aircraft gas turbine 2. The rotor blade 1a has a blade root 4a, a blade platform 6a and an aerodynamically optimized blade leaf 8a. In the exemplary embodiment shown, the blade root 4a is provided with a fir-tree structure, by means of which a reliable connection of the rotor blade 1a with a disk, which is not shown, is achieved.

Figure 2:
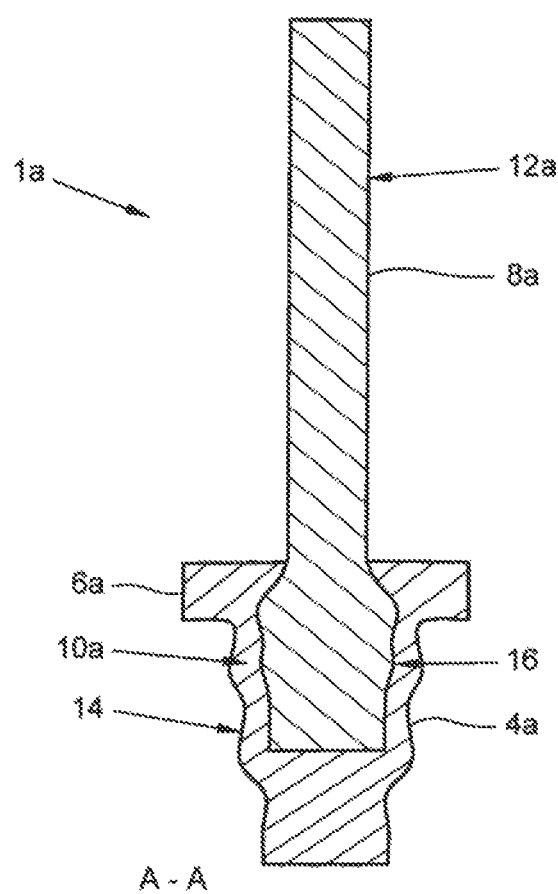
FIG. 2 shows a sectional representation of the rotor blade from FIG. 1 along the line of intersection A-A in accordance with a first exemplary embodiment in accordance with the invention.

As can be inferred in particular from FIG. 2, which shows a sectional representation along the line A-A from FIG. 1, the blade root 4a is applied to the blade leaf 8a in accordance with the invention by means of a thermal spraying method. The method in accordance with the invention in this connection comprises the formation of the blade leaf 8a from at least one first material and the application of the blade root 4a consisting of at least one second material to the blade leaf 8a by means of a thermal spraying method. Such a method renders possible the formation of the blade root 4a from materials that are different from that of the blade leaf 8a so that the choice of material of the blade sections can be made in an optimized manner with regard to loading. The rotor blade 1a has, in its blade-leaf region 8a, a complex geometry that can be produced by means of a method in accordance with the invention, with there being a high level of flexibility with respect to changes in the geometry of the rotor blade 1a. On account of the production of the blade root from a suitable material it is possible to dispense with a wear-protection coating of the blade root 4a so that a reduction in costs is achieved. It is advantageous, furthermore, that the blade leaves 8a can be produced inexpensively in large piece numbers, and the adaptation of the blades 1a to the disks can be effected by means of different blade roots 4a that can be produced with flexible contouring.

It has proved to be particularly advantageous if a cold-gas-spraying method is used as the thermal spraying method. Such a cold-gas-spraying method renders possible the formation of a firmly adhering, high-strength blade root 4a from a material that is different from that of the blade leaf 8a.

The blade leaf 8a has been formed, in the case of the example shown, by a generative method by means of a selective laser melting method. Such a method renders possible contour-true production of the blade leaf 8a from high-temperature-resistant materials, with it being possible to adapt the component geometry on account of the execution of the generative method, for optimization for example, in a rapid and inexpensive manner. Alternatively, the blade leaf 8a can be produced simply in terms of manufacturing techniques by means of a conventional casting method.

The blade root 4a is produced by spraying on a material that is more ductile in relation to the first material and has a lower level of susceptibility to cracking. The blade leaf 8a has been formed from a high-temperature-resistant, lightweight TiAl alloy, since the possibly high level of brittleness and susceptibility to cracking of such materials in the region of the blade root 4a on account of the types of loads that occur in this section can be circumvented as a result of the formation in accordance with the invention of the blade root 4a from a ductile material on the blade leaf 8a by means of a thermal spraying method. The blade root 4a has been produced by spraying on IN718 brand alloy 718. The cold-gas spraying was effected in such a way that the contour of the blade root 4a was already substantially produced during the spraying. Accordingly, the blade root 4a was formed so that it was already close to its final contour and after the spraying was merely finely machined, with cutting. As a result, reworking of the sprayed component section is reduced to a minimum.

The blade leaf 8a was formed in such a way that, after the application of the blade root 4a, in addition to the force- and material-locking connection a form-locking connection is established. In particular, the blade leaf 8a and the blade root 4a have been formed in such a way that the blade leaf 8a, at a lower portion 10a of the blade leaf, has a cross-section that is enlarged in sections in comparison with an upper portion 12a of the blade leaf, that is, the rest of the blade leaf 8a. As a result of the geometrical design of the blade leaf 8a in the region of the blade root 4a, the connection with the blade root 4a can be further improved. In particular, the separation of the blade leaf 8a from the blade root 4a during operation can be prevented, even in the case of extreme loads. In the case of the exemplary embodiment of the method in accordance with FIG. 2, in the region of the blade root 4a the blade leaf 8a is constructed with an outer contour 16 that is similar to the outer contour course 14 of the blade root 4a. This means that the blade leaf 8a is provided with a fir-tree-like structure 16 which with spacing approximates the outer contour 14 of the later blade root 4a. The cold-gas-spraying is subsequently effected in such a way that the blade root 4a is formed with a fir-tree structure which is finally finely machined with cutting. Alternatively, a shaped body is sprayed on that is subsequently roughly and finely machined with cutting.

Figure 3:
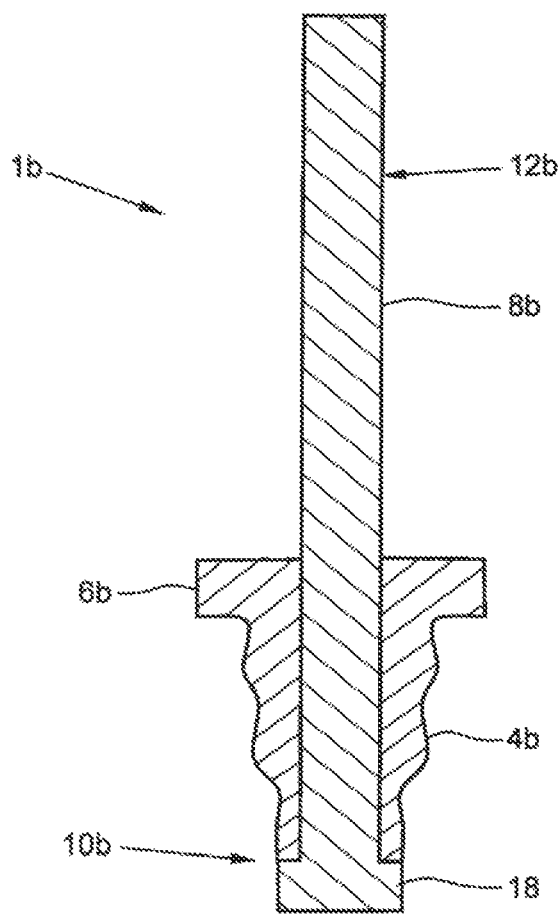
FIG. 3 shows a sectional representation of a rotor blade in accordance with a second exemplary embodiment in accordance with the invention corresponding to a line of intersection A-A.

As can be inferred from FIG. 3, which shows a sectional representation of a rotor blade 1b in accordance with a second exemplary embodiment in accordance with the invention corresponding to a line of intersection A-A, a blade leaf 8b and a blade root 4b are formed in such a way that a free end section 18 of the blade leaf 8b, or a lower portion 10b of the blade leaf, in the root region has a cross-section that is enlarged in a section in comparison with the rest of the blade leaf 8b above a blade platform 6b, that is, an upper portion 12b of the blade leaf. The blade leaf 8b extends through the blade root 4b in the direction of the fixable end of the blade 1b. The enlarged end section, in the case of the concrete exemplary embodiment, is formed as a substantially T-shaped holding section 18 with a substantially rectangular cross-section that forms a tie rod. The sprayed blade root 4b follows on from the holding section 18 in a flush manner on the peripheral side so that the holding section 18 forms a portion of the blade root 4b.

A method is disclosed for producing a rotor blade or stator blade 1a, 1b of a gas turbine, in particular an aircraft gas turbine 2, comprising the formation of a blade leaf 8a, 8b from at least one first material and the application of a blade root 4a, 4b consisting of least one second material to the blade leaf 8a, 8b by means of a thermal spraying method. Also disclosed is a rotor blade or stator blade 1a, 1b produced according to such a method.

The invention claimed is:

1. A blade for a gas turbine, the blade comprising:
  a blade leaf formed from at least one first material and having an upper portion proximate to a free end and a lower portion proximate to a fixable end;
  a blade root formed from at least one second material disposed on the lower portion of the blade leaf so as to establish a form-locking connection therebetween, the blade root having
    an upper end defining a blade platform and
    an outer contour with a fir-tree-like configuration disposed below the blade platform and extending to a blade root lower end;
  wherein the blade leaf extends through the blade root in the direction of the fixable end past the blade root lower end;
  wherein the lower portion of the blade leaf extending past the blade root lower end is enlarged in cross-section in comparison with the rest of the blade leaf above the blade platform to form at least part of the form-locking connection; and
  wherein the at least one second material is a thermally sprayed material that is different from the at least one first material and is more ductile in relation to the at least one first material; and
  wherein the lower portion of the blade leaf extends past the blade root lower end and includes a substantially T-shaped holding section with a substantially constant rectangular cross-section abutting the blade root lower end and extending from the blade root lower end to a lower end of the blade leaf.

2. A blade for a gas turbine in accordance with claim 1, wherein the outer contour of the blade root extends from the holding section of the blade leaf in a flush manner on the peripheral side toward the free end of the blade leaf.

* * * * *